(12) United States Patent
Mahipal et al.

(10) Patent No.: US 12,093,901 B2
(45) Date of Patent: Sep. 17, 2024

(54) PREDICTIVE MAINTENANCE OF VEHICLE COMPONENTS

(71) Applicant: ANI TECHNOLOGIES PRIVATE LIMITED, Bengaluru (IN)

(72) Inventors: Punit Mahipal, Bangalore (IN); Hitesh Hinduja, Thane (IN); Vamsee Krishna Voruganti, Bangalore (IN); Gaurav Agarwal, Bangalore (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 558 days.

(21) Appl. No.: 16/951,706

(22) Filed: Nov. 18, 2020

(65) Prior Publication Data

US 2022/0067667 A1   Mar. 3, 2022

(30) Foreign Application Priority Data

Aug. 25, 2020  (IN) .............................. 202041036622

(51) Int. Cl.
*B60R 16/023*   (2006.01)
*G05B 23/02*   (2006.01)
(Continued)

(52) U.S. Cl.
CPC ......... *G06Q 10/20* (2013.01); *B60R 16/0234* (2013.01); *G05B 23/0283* (2013.01);
(Continued)

(58) Field of Classification Search
CPC ................ G06Q 10/20; B60R 16/0234; G05B 23/0283; G06N 20/00; G06N 3/006;
(Continued)

(56) References Cited

U.S. PATENT DOCUMENTS 6,363,303 B1   3/2002 Bertness
6,862,504 B2   3/2005 Hamdan
(Continued)

FOREIGN PATENT DOCUMENTS

CN   103954914 A   7/2014
CN   109324297 A   2/2019
(Continued)

OTHER PUBLICATIONS

1 International Search Report and written opinion for PCT/IN2021/050818 mailed on Dec. 16, 2021.

*Primary Examiner* — Peter D Nolan
*Assistant Examiner* — Ashley L Redhead, Jr.
(74) *Attorney, Agent, or Firm* — CHIP Law Group

(57) ABSTRACT

A method for predictive maintenance of a component of a vehicle includes collection of first operational data, from a telematics device of the vehicle, for a set of parameters associated with the component. From the first operation data, a first dataset is selected based on an engine status of an engine of the vehicle. The first dataset is processed to obtain a plurality of feature values and the plurality of feature values are segregated into a plurality of clusters. A classifier is trained based on the plurality of clusters to determine the health status of the component. Real-time or near real-time operational data for the set of parameters is received, from the telematics device of the vehicle. The received operational data is used as an input to the trained classifier and the health status of the component is determined based on an output of the trained classifier.

6 Claims, 10 Drawing Sheets

(51) Int. Cl.
*G06N 20/00* (2019.01)
*G06Q 10/20* (2023.01)
*G07C 5/00* (2006.01)
*G07C 5/08* (2006.01)

(52) U.S. Cl.
CPC ............. *G06N 20/00* (2019.01); *G07C 5/006* (2013.01); *G07C 5/0808* (2013.01)

(58) Field of Classification Search
CPC ...... G06N 20/10; G07C 5/006; G07C 5/0808; G07C 5/008
See application file for complete search history.

(56) References Cited

U.S. PATENT DOCUMENTS

| | | | |
|---|---|---|---|
| 7,184,866 B2* | 2/2007 | Squires | B60L 3/12 |
| | | | 701/34.3 |
| 7,554,294 B2 | 6/2009 | Srinivasan | |
| 8,095,261 B2 | 1/2012 | Howell | |
| 9,465,077 B2 | 10/2016 | Love | |
| 9,846,979 B1 | 12/2017 | Sainaney | |
| 9,881,428 B2 | 1/2018 | Barfield | |
| 9,894,526 B2 | 2/2018 | Giraud | |
| 9,990,781 B2* | 6/2018 | Haidar | G07C 5/006 |
| 10,197,631 B2 | 2/2019 | Barfield | |
| 10,552,762 B2 | 2/2020 | Firooz et al. | |
| 11,335,191 B2* | 5/2022 | Lewis | G08G 1/0129 |
| 2011/0082621 A1 | 4/2011 | Berkobin | |
| 2018/0229744 A1* | 8/2018 | Manzari | F01M 11/10 |
| 2019/0176639 A1* | 6/2019 | Kumar | B60L 3/0046 |
| 2019/0385385 A1* | 12/2019 | Davidson | G07C 5/0808 |
| 2019/0385387 A1* | 12/2019 | Davidson | G07C 5/008 |
| 2020/0051347 A1 | 2/2020 | Bohl | |
| 2021/0049471 A1* | 2/2021 | Kale | G06N 3/084 |
| 2022/0114560 A1* | 4/2022 | Senzer | G07C 5/085 |

FOREIGN PATENT DOCUMENTS

| | | |
|---|---|---|
| CN | 110568359 A | 12/2019 |
| WO | 2018042616 A1 | 3/2018 |

* cited by examiner

PREDICTIVE MAINTENANCE OF VEHICLE COMPONENTS

CROSS-RELATED APPLICATIONS

This application claims priority of Indian Non-Provisional Application No. 202041036622, filed Aug. 25, 2020, the contents of which are incorporated herein by reference.

FIELD

Various embodiments of the disclosure relate generally to predictive maintenance. More specifically, various embodiments of the disclosure relate to methods and systems for predictive maintenance of a component of a vehicle.

BACKGROUND

Travelling is an important part of an individual's day to day life. The individual may require to travel for various of reasons such as work, education, or vacation. For traveling, the individual may use a vehicle such as a bicycle, a tri-cycle, an automobile, a car, or a truck. The vehicle may have multiple components that are required for operation thereof.

However, few components of the vehicle, such as a battery and an alternator, may wear out with time and their performance may degrade. Further, wearing out of the components may affect the performance of the vehicle. For example, the components may break down while the vehicle is on road. Such sudden break down of the vehicle may cause economical as well as emotional despair to an owner/driver of the vehicle.

In light of the above concerns, the components of the vehicle need to be monitored for preventing sudden break downs. Such monitoring may be performed by tracking performance of the components and executing planned maintenance and repair. A known approach for monitoring the components of the vehicle includes performing periodic check-ups of the components at a maintenance center. However, the periodic check-ups involve physical presence of the vehicle at the maintenance center. The owner/driver may find it inconvenient to bring the vehicle to the maintenance center. In some scenarios, the owner/driver may even forget or avoid bringing the vehicle to the maintenance center. Another known solution for monitoring the components of the vehicle involves periodic monitoring of some specific parameters (for example, resistance, voltage) associated with the components by using a specialized device. However, the specialized device may be prone to failure and damages, and therefore, may sometimes output faulty readings, which is undesirable. Further, periodically monitoring the parameters is a cumbersome task for the owner/driver.

In light of the foregoing, there exists a need for a technical and reliable solution that overcomes the abovementioned problems, and ensures efficient monitoring of the health of vehicle components, for example, a battery and an alternator in a vehicle.

SUMMARY

Methods for predictive maintenance of a component of a vehicle are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
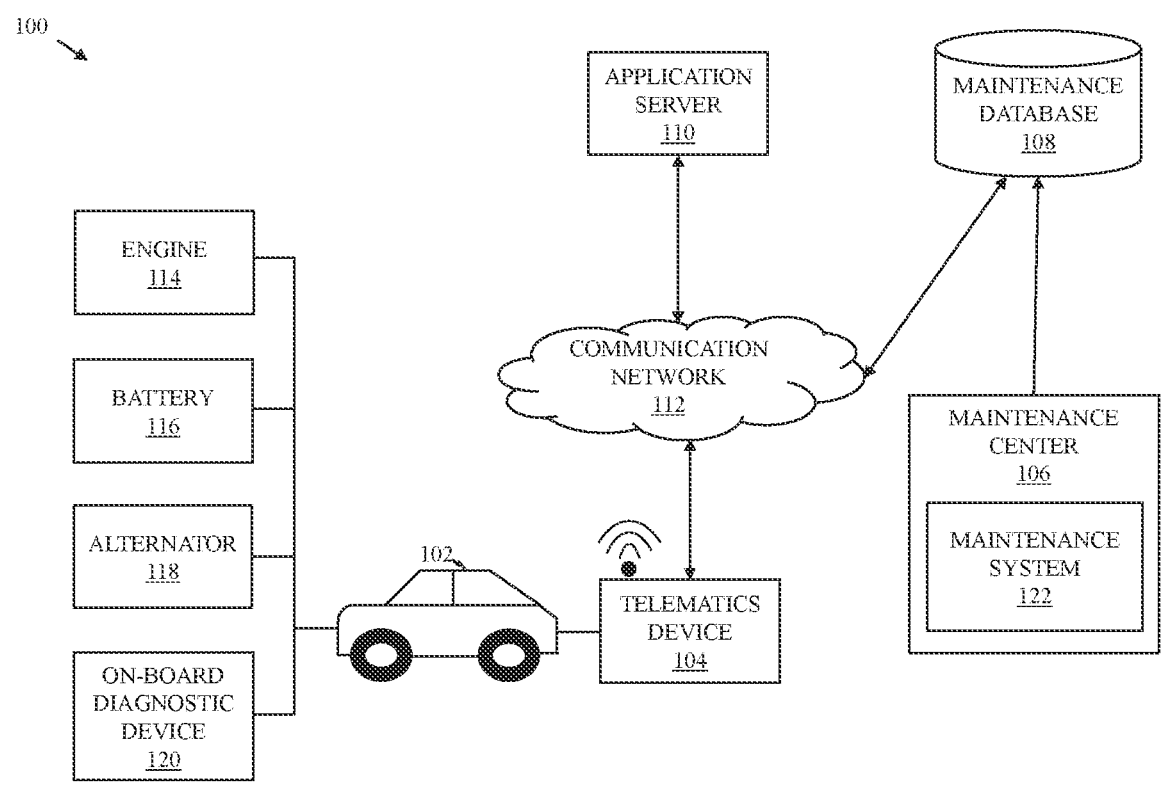
FIG. 1 is a block diagram that illustrates a system environment for predictive maintenance of a component of a vehicle, in accordance with an exemplary embodiment of the disclosure.

Certain embodiments of the disclosure may be found in disclosed systems and methods for determining predictive maintenance of a component (for example, a battery and an alternator) of a vehicle. Exemplary aspects of the disclosure provide methods for predictive maintenance of the component. The methods include various operations that are executed by a server (for example, an application server) predictive maintenance of the component. In an embodiment, the server may be configured to collect first operational data for a set of parameters associated with the component. The first operational data is collected over a first time-interval. The server may be configured to collect the first operational data from a telematics device of the vehicle. The server may be further configured to select a first dataset from the first operational data based on an engine status of an engine of the vehicle. For example, the server may be configured to select the first dataset based on an OFF engine status of the engine. The server may be configured to process the first dataset to obtain a plurality of feature values. The server may be further configured to segregate the plurality of feature values into a plurality of clusters such that each cluster is associated with a specific health status. Further, the server may be configured to train a classifier based on the plurality of clusters. The server may be configured to receive, from the telematics device, real-time or near real-time operational data for the set of parameters associated with the component. The real-time or near real-time operational data is used as an input to the trained classifier. The server may be further configured to determine a health status of the component based on an output of the trained classifier for the real-time or near real-time operational data. In one embodiment, the component is a battery of the vehicle. In another embodiment, the component is an alternator of the vehicle.

Thus, the methods and systems of the disclosure provide a solution for predictive maintenance of the component of the vehicle, therefore allows for regular monitoring of the health status and performance of the component. The methods and systems significantly reduce a requirement to periodically check the performance and health of the component manually using a physical device or by taking the vehicle to a maintenance center. Beneficially, the methods disclosed herein significantly reduce effort and human interference required for keeping the health status of the component in check. The disclosed methods and systems determine the health status based on real-time or near real-time operational data, and hence are capable of determining a deterioration in performance of the component in real-time or near real-time. Further, such determination of the health status of the component prevents unexpected break downs or faults in the vehicle. Therefore, an owner/driver of the vehicle is prevented from significant cost of on-road support, loss of time, emotional despair caused due to break downs. Further, the disclosed methods allow for a predictive maintenance of the vehicle based on the health status of the component.

FIG. 1 is a block diagram that illustrates a system environment 100 for predictive maintenance of a component of a vehicle 102, in accordance with an exemplary embodiment of the disclosure. The system environment 100 includes the vehicle 102 associated with a telematics device 104, a maintenance center 106, a maintenance database 108, and an application server 110. The telematics device 104, the maintenance database 108, and the application server 110 are configured to communicate with each other via a communication network 112. Examples of the communication network 112 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the telematics device 104, the maintenance database 108, and the application server 110) in the system environment 100 may be coupled to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof. For the sake of brevity, the system environment 100 is shown to include only one vehicle (i.e., the vehicle 102). However, in an actual implementation, the system environment 100 may include multiple vehicles of different makes, models, age, or the like, without deviating from the scope of the disclosure.

The vehicle 102 is a mode of transportation that is utilized, by a user (such as a driver or an owner of the vehicle 102), to commute from one location to another location. The vehicle 102 may include suitable logic, circuitry, interfaces and/or code, executable by the circuitry, that may be configured to control and perform one or more operations with or without any driving assistance from the driver. In an embodiment, the vehicle 102 may be deployed by a transport service provider (e.g., a cab service provider) to cater to travelling requirements of various passengers. In another embodiment, the vehicle 102 may be privately owned by the user for fulfilling self-travelling requirements. Examples of the vehicle 102 may include, but are not limited to, an automobile, a bus, a car, an auto rickshaw, and a bike. Further, the vehicle 102 may include a plurality of components such as an engine 114, a battery 116, an alternator 118, and an on-board diagnostic (OBD) device 120 to ensure a continuous functioning thereof. It may be apparent to a person of ordinary skill in the art that the vehicle 102 may include various additional components that are not shown in FIG. 1 for the sake of brevity.

The engine 114 may include suitable logic, circuitry, interfaces, and/or code, executable by the circuitry, that may be configured to facilitate one or more operations of the vehicle 102. The engine 114 may be configured to convert one form of energy provided by fuel combustion or electric charge into mechanical motions that are used to facilitate functioning of the vehicle 102. The engine 114 may operate on fuel or electric charge provided by the battery 116. The vehicle 102 may be in an operational state when ignition of the engine 114 is ON. The vehicle 102 may be in non-operational state when ignition of the engine 114 is OFF.

The battery 116 may include suitable logic, circuitry, interfaces, and/or code, executable by the circuitry, that may be configured to power the vehicle 102. The battery 116 is an energy storage device that may be utilized for providing necessary power (such as electric charge or power) to the vehicle 102. In an example, the battery 116 may be one of a lithium-ion battery, Nickel Metal Hydride (NIMH) battery, Nickel Cadmium (NiCd) battery, lead-acid battery, ultracapacitors, zinc air battery, or the like.

The alternator 118 may include suitable logic, circuitry, interfaces, and/or code, executable by the circuitry, that may be configured to charge one or more components (such as the battery 116) of the vehicle 102. The alternator 118 may be further configured to power one or more electrical components of the vehicle 102 while the ignition of the vehicle 102 is ON. Examples of the alternator 118 may include, but are not limited to, an automotive alternator, a diesel-electric locomotive alternator, a marine alternator, a brushless alternator, and a radio alternator.

In an embodiment, the battery 116 provides power that is required to start the vehicle 102. Further, while the vehicle 102 is running, the alternator 118 may be configured to generate power to facilitate functioning of the one or more electric components of the vehicle 102 and charging of the battery 116.

In an embodiment, the vehicle 102 may be an electric vehicle. In such embodiment, the vehicle 102 may be configured to operate only on power derived from the battery 116. The vehicle 102 may not require the alternator 118 to facilitate power requirements thereof.

The OBD device 120 may include suitable logic, circuitry, interfaces, and/or code, executable by the circuitry, that may be configured to diagnose the plurality of components (such as, the engine 114, the battery 116, the alternator 118, and the like) of the vehicle 102. The OBD device 120 may be further configured to generate one or more diagnostic trouble codes (DTCs) based on the diagnosis of the plurality of components. The OBD device 120 may be a standalone device installed in the vehicle 102 or may be integrated with one of the plurality of components of the vehicle 102. The OBD device 120 may be configured to diagnose the plurality of components periodically (such as, daily, after a predefined number of days, weekly, monthly, yearly, and so forth) or when instructed by the driver.

The telematics device 104 may include suitable logic, circuitry, interfaces, and/or code, executable by the circuitry, that may be configured to perform one or more operations for obtaining operational data of a component (e.g., the battery 116 and the alternator 118) in the vehicle 102. The operational data may be obtained for a set of parameters associated with the component. The telematics device 104 may be configured to communicate with the component of the vehicle 102 to obtain the operational data. The telematics device 104 may further obtain the operational data in the form of DTCs from the OBD device 120. The telematics device 104 may be further configured to transmit the operational data and vehicle data of the vehicle 102 to the application server 110 via the communication network 112. Examples of vehicle data include, but are not limited to a vehicle model, a make of the vehicle 102, a vehicle manufacturing year, and a city of operation of the vehicle 102. The telematics device 104 may communicate the operational data continuously, periodically, or when prompted by the driver or the application server 110. The telematics device 104 may be a standalone device or may be integrated with an in-built component (for example, the OBD device 120) of the vehicle 102.

The set of parameters for which the operational data of the component is obtained by the telematics device 104 may include those attributes that directly or indirectly serve as an indicator of the health status of the component. The operational data may include one or more values associated with the set of parameters. The operational data may vary based on the health status of the component. In an example, the operation data may have ideal operational values when the component is new. In another example, the operational data may have alarming values when the component is a decade old. Thus, a pattern of change in the operational data of the component may be analyzed to determine the health status of the component. The set of parameters may include an engine status (e.g., engine ON or engine OFF) of the engine 114, voltage data associated with the component, the DTCs associated with the component, a past count of each DTC, an engine ON/OFF count of the engine 114, maximum and minimum voltages associated with the component, an average voltage associated with the component, a deviation of minimum voltage associated with the component, an average minimum voltage associated with the component, an average maximum voltage associated with the component, and/or an average engine ON time of the engine 114. In an exemplary embodiment, the telematics device 104 may also communicate a driver's feedback (for example, voice and/or text, a signal, a gesture, a press of a button, and the like) regarding the performance of the component to one of the application server 110 and the maintenance database 108.

The maintenance center 106 is an entity (for example, a place, an organization, or the like) that provides a platform for physical inspection of the performance of the vehicle 102. The vehicle 102 may be examined at the maintenance center 106 weekly, monthly, annually, or so forth. The maintenance center 106 may include a maintenance system 122. The maintenance system 122 may include suitable logic, circuitry, interfaces, and/or code, that may be configured to control and perform one or more operations for performing troubleshooting and maintenance of the plurality of components of the vehicle 102. The maintenance system 122 may be further configured to perform operations for storing maintenance data (such as service and repair data) associated with the plurality of components of the vehicle 102 in the maintenance database 108. For example, the maintenance system 122 may be configured to communicate the maintenance data associated with the examination of the vehicle 102 to the maintenance database 108 for storage. The maintenance data may include pre-maintenance data that is indicative of a pre-maintenance condition of the plurality of components and post-maintenance data that is indicative of a post-maintenance condition of the plurality of components. The maintenance data may further include a maintenance action taken for performing maintenance of the vehicle 102. In an embodiment, maintenance data associated with the battery 116 and the alternator 118 of the vehicle 102 may include pre-maintenance data indicative of a pre-maintenance condition of the battery 116 and the alternator 118, post-maintenance data indicative of a post-maintenance condition of the battery 116 and the alternator 118, and a maintenance action taken during maintenance of the battery 116 and the alternator 118. In an example, prior to maintenance, the alternator 118 may be exhibiting a very low maximum voltage. Thus, the pre-maintenance data associated with the alternator 118 may include a maximum voltage reading of 5 volts, a maintenance action taken during maintenance of the alternator 118 may be replacement of the alternator 118, and the post-maintenance data may include a maximum voltage reading of 14.5 volts of the new alternator.

In an embodiment, the maintenance system 122 may be automated and may not require human intervention for operation thereof. In an embodiment, the maintenance system 122 may be semi-automated and may require human intervention for operation thereof.

The maintenance database 108 may include suitable logic, circuitry, interfaces, and/or code, executable by the circuitry, that may be configured to store the maintenance data of the vehicle 102 and/or other vehicles, received from the maintenance system 122. In one embodiment, the maintenance database 108 may be a cloud-based storage server that is accessible to the maintenance system 122 and the application server 110.

The application server 110 may include suitable logic, circuitry, interfaces, and/or code, executable by the circuitry, that may be configured to perform one or more operations for determining the health status of various components of the vehicle 102, for example, the battery 116 and/or the alternator 118. The application server 110 may be configured to communicate with the telematics device 104 and the maintenance database 108 via the communication network 112. In an embodiment, the application server 110 may be a cloud-based server. In another embodiment, the application server 110 may be a local server. The application server 110 may be configured to operate in two modes such as a training mode and an implementation mode. The application server 110 may operate in the training mode for training a classifier (as shown in FIG. 2) to determine the health status various components of the vehicle 102, for example, the battery 116 and/or the alternator 118. After the classifier is trained, the application server 110 may operate in the implementation mode for determining the health status of various components of the vehicle 102 in real-time or near-real time.

During the training mode, the application server 110 may be configured to receive operational data of a component of the vehicle 102 and the vehicle data of the vehicle 102 from the telematics device 104. The application server 110 may further receive operational data of the component of other vehicles (not shown) and the vehicle data of the other vehicles. The application server 110 may be configured to collect the operational data and the vehicle data associated with the vehicle 102 and/or the other vehicles over a first time-interval. The operational data collected by the application server 110 over the first time-interval is referred to as "first operational data". In an embodiment, the first time-interval may be one week, 30 days, 60 days, 100 days, 360 days, or the like. In another embodiment, the first operational data may be collected and communicated to the application server 110 by a database server (not shown) without deviating from the scope of the disclosure.

From the first operational data that is collected, the application server 110 may be configured to select a dataset based on an engine status of the engine 114 of the vehicle 102 and engine statuses of engines of the other vehicles. For example, from the first operational data of the vehicle 102, the application server 110 may only select the dataset that was received when the engine 114 had OFF engine status and discard the remaining first operational data. The application server 110 may be further configured to process the selected dataset to obtain a plurality of feature values for a plurality of features. The plurality of feature values may include a plurality of moving average values, a plurality of moving standard deviation values, a plurality of cumulative sum values, a plurality of rolling mean values, and a plurality of rolling standard deviation values obtained by processing the selected dataset. For example, the selected dataset associated with the battery 116 may include discharge voltages of the battery 116 during an OFF engine status of engine 114 for the first time-interval. In such a scenario, the plurality of feature values associated with the battery 116 may include various moving average and moving standard deviation values of the discharge voltages of the battery 116.

The application server 110 may be further configured to segregate the plurality of feature values into a plurality of clusters. Each cluster may correspond to a specific health status of the component. For example, the application server 110 may segregate the plurality of feature values into first through third clusters such that the first cluster corresponds to a good health status, the second cluster corresponds to a bad health status, and the third cluster corresponds to a very bad health status. The application server 110 may label each cluster based on the health status indicated thereby. The application server 110 may be further configured to train the classifier based on the plurality of clusters. After the classifier is trained, the application server 110 may be configured to validate and re-train the trained classifier using historical maintenance data of the vehicle 102 and/or other vehicles stored in the maintenance database 108, for improving an accuracy level of the trained classifier. When a desired accuracy level is achieved for the trained classifier, the application server 110 may be configured to operate in the implementation mode.

During the implementation mode, the application server 110 may be configured to receive, from the telematics device 104, real-time or near real-time operational data (hereinafter, "second operational data") of the component (e.g., the battery 116 and/or the alternator 118) of the vehicle 102 for the set of parameters. The application server 110 may be configured to provide the second operational data as an input to the classifier 210 to determine the health status of the component. The health status of the component is determined based on an output of the classifier. Further, the application server 110 may be configured to determine a remaining useful life of the component for a second time-interval. Examples of the second time-interval include following 30 days, 60 days, 90 days, 365 days, and the like. In an exemplary embodiment, the application server 110 may be configured to communicate the determined health status of the component to one of a user device (as shown in FIG. 2) associated with the vehicle 102, the telematics device 104, an indicator associated with the vehicle 102, or the like. The health status of the component refers to a working state and performance exhibited by the component. The health status may be determined for predicting and planning a requirement of maintenance of the vehicle 102. Such predictive maintenance refers to planned and scheduled maintenance of the vehicle 102 based on the determined health status of the component. The predictive maintenance of the component allows for an improved performance, longevity, and optimized cost of maintenance for the vehicle 102.

Figure 2A:
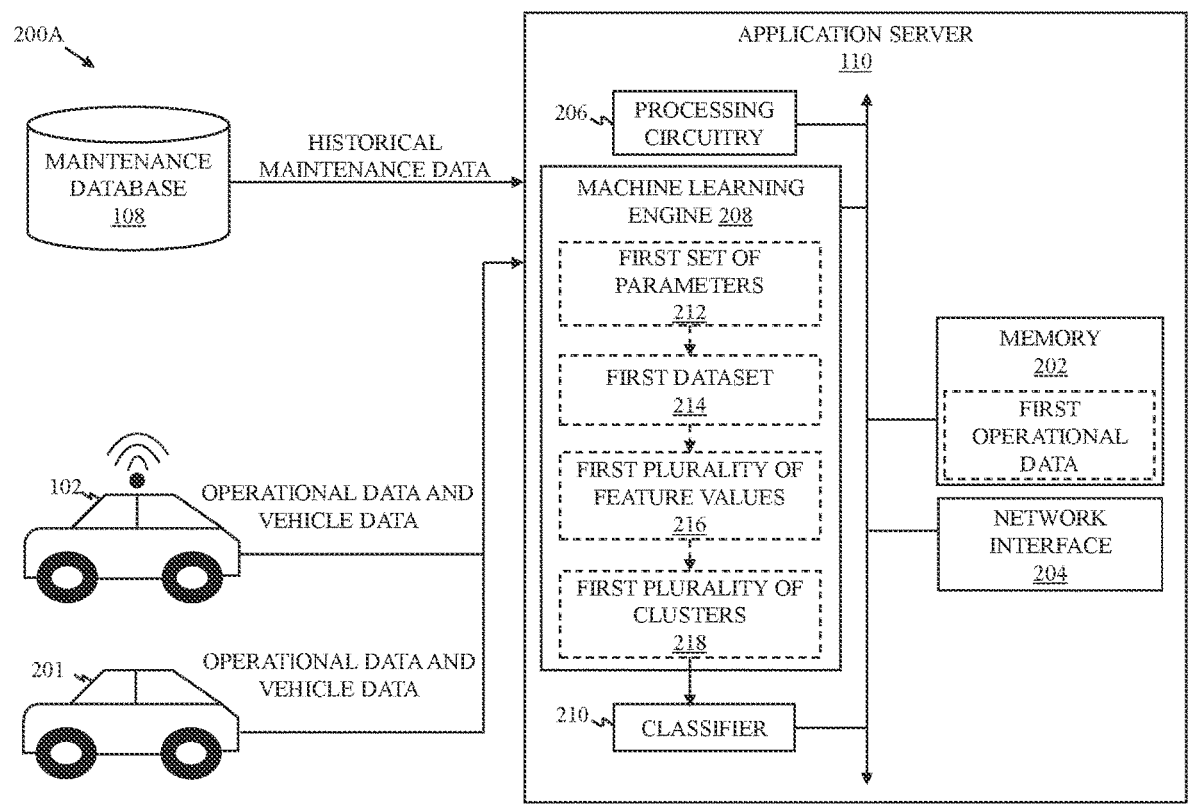
FIG. 2A is a block diagram that illustrates an exemplary scenario for training a classifier for predictive maintenance of a battery of a vehicle, in accordance with an exemplary embodiment of the disclosure.

FIG. 2A is a schematic diagram that illustrates an exemplary scenario 200A for training the classifier for predictive maintenance of a battery of a vehicle, in accordance with an exemplary embodiment of the disclosure. The application server 110 may include the memory 202, the network interface 204, the processing circuitry 206, the machine learning engine 208, and the classifier (hereinafter, referred to and designated as "the classifier 210").

The memory 202 may include suitable logic, circuitry, and interfaces that may be configured to store one or more instructions which when executed by the processing circuitry 206 cause the processing circuitry 206 to perform various operations for predictive maintenance of vehicle batteries (e.g., the battery 116). The memory 202 may be configured to store the first operational data associated with the battery 116 and/or batteries of other vehicles (e.g., a vehicle 201). The memory 202 may be accessible by the processing circuitry 206, the machine learning engine 208, and the classifier 210. Examples of the memory 202 may include, but are not limited to, a random access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 202 in the application server 110, as described herein. In another embodiment, the memory 202 may be realized in form of a database server or a cloud storage working in conjunction with the application server 110, without departing from the scope of the disclosure.

The network interface 204 may include suitable logic, circuitry, interfaces, and/or code, executable by the circuitry, that may be configured to enable the application server 110 to communicate with the maintenance database 108, the telematics device 104, and a user device 224 associated with the vehicle 102. The network interface 204 may be implemented as a hardware, software, firmware, or a combination thereof. Examples of the network interface 204 may include a network interface card, a physical port, a network interface device, an antenna, a radio frequency transceiver, a wireless transceiver, an Ethernet port, a universal serial bus (USB) port, or the like.

The processing circuitry 206 may include suitable logic, circuitry, interfaces, and/or code, executable by the circuitry, that may be configured to execute the instructions stored in the memory 202 to perform various operations for predictive maintenance of vehicle batteries (e.g., the battery 116). The processing circuitry 206 may be configured to perform various operations associated with data collection and data processing. The processing circuitry 206 may be implemented by one or more processors, such as, but are not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 206 may be compatible with multiple operating systems.

When the application server 110 is operating in the training mode, the processing circuitry 206 may employ a feature or variable selection technique to select a first set of parameters 212 that may have a causal relationship (e.g., direct causal relationship or indirect causal relationship) or a high degree of correlation with the health status of a battery in a vehicle. The processing circuitry 206 may be configured to receive operational data for the first set of parameters 212 associated with the battery 116 of the vehicle 102 and batteries of the other vehicles (e.g. the vehicle 201). The operational data may be received from the telematics device 104 of the vehicle 102 and telematics devices of the other vehicles, via the communication network 112. The processing circuitry 206 may be further configured to collect the operational data over the first time-interval. The operational data collected over the first time-interval is referred to as the first operational data. The processing circuitry 206 may be further configured to store the collected first operational data as historical operational data in the memory 202 or a cloud database server (not shown). The processing circuitry 206 may be further configured to receive the vehicle data and the historical maintenance data of the vehicles 102 and 201. The historical maintenance data may be received from the maintenance database 108.

The first set of parameters 212 that are indicators of a health of a battery and for which the first operational data is collected may include engine status and voltage data (such as the discharge voltage of the battery 116). For example, for the vehicle 102, the first operational data may include ON/OFF engine status of the engine 114 and the voltage data including the discharge voltage of the battery 116. The discharge voltage of the battery 116 refers to loss of stored charge in the battery 116 when the battery 116 is not in use. Such self-discharge may reduce life-span of the battery 116. In an example, the discharge voltage associated with the battery 116, when it is new, may be very low. As the battery 116 ages, the discharge voltage may keep increasing gradually and eventually the discharge voltage may get high enough to drain the battery 116 completely. Therefore, observing a change in the discharge voltage of the battery 116 over time may provide information regarding any deterioration in the health status of the battery 116.

The machine learning engine 208 may include suitable logic, circuitry, interfaces, and/or code, executable by the circuitry, that may be configured to perform one or more operations for training the classifier 210 to determine the health status of the battery 116. Examples of the machine learning engine 208 may include, but are not limited to, an ASIC processor, a RISC processor, a CISC processor, and an FPGA processor. The machine learning engine 208 may also correspond to a CPU, a GPU, an NPU, a DSP, or the like. It will be apparent to a person of ordinary skill in the art that the machine learning engine 208 may be compatible with multiple operating systems. Further, the machine learning engine 208 may include a machine-learning model that implements any suitable machine-learning techniques, statistical techniques, or probabilistic techniques for performing the one or more operations associated with the training of the classifier 210.

The machine learning engine 208 may be configured to select a first dataset 214 from the first operational data. The first dataset 214 may be selected based on the OFF engine status of the engine 114 and engines of other vehicles. In an embodiment, the first dataset 214 includes values of the discharge voltage of the battery 116 when the engine 114 is OFF. Similarly, the first dataset 214 may further include values of the discharge voltage of the batteries of other vehicles (e.g., the vehicle 201) corresponding to OFF engine status.

The machine learning engine 208 may be further configured to process and analyze the first dataset 214 (i.e. the values of the discharge voltage selected based on the OFF engine status) to obtain a first plurality of feature values 216 corresponding to a first plurality of features. Each feature of the first plurality of features may be selected to capture a change, a trend, or a pattern in the first dataset 214 across various time periods (e.g., days, weeks, months, years, or the like) over the first time-interval. In other words, the machine learning engine 208 processes the first dataset 214 to determine historical pattern of the discharge voltage of the batteries (e.g., the battery 116). Beneficially, the historical pattern provides information regarding deviation in the discharge voltage of the battery 116 over a period of time. In one example, a first feature of the first plurality of features is a moving average for the discharge voltage and a second feature of the first plurality of features is a moving standard deviation for the discharge voltage. Thus, the machine learning engine 208 may process the first dataset 214, and obtain the plurality of moving average values and the plurality of moving standard deviation values for the discharge voltage. The plurality of moving average values and the plurality of moving standard deviation values are obtained for each instance of OFF engine status. In an exemplary scenario, the discharge voltage of the battery 116 over a week may include values x1, x2, x3, x4, x5, x6, and x7. Thus, a moving average value for day 1 is obtained based on moving average (x1), moving average value for day 2 is obtained based on moving average (x1, x2), and moving average value for day 3 is obtained based on moving average (x1, x2, x3). Similarly, moving average values for each of day 4 to day 7 are obtained based on moving average across discharge voltage of previous days and current day. Further, moving standard deviation value for day 1 is obtained based on standard deviation (x1), moving standard deviation value for day 2 is obtained based on standard deviation (x1, x2), and moving standard deviation value for day 3 is obtained based on standard deviation (x1, x2, x3). Further, moving standard deviation values for each of day 4 to day 7 are obtained based on moving standard deviation across discharge voltage of previous days and current day. Similarly, based on the first dataset 214, the plurality of moving average values and the plurality of moving standard deviation values are obtained for the other vehicles. The obtained plurality of moving average values and the plurality of moving standard deviation values constitute the first plurality of feature values 216.

In one embodiment, each feature of the first plurality of features may be assigned a weight corresponding to a strength of a relationship of correlation or causation between the feature and the health status of the battery. For example, the second feature may be assigned a higher weight than the first feature, based on a determination by the machine learning engine 208 that the moving standard deviation of the discharge voltage is a better predictor of the health status of the battery than the moving average of the discharge voltage. It will be apparent to a person of ordinary skill in the art that the abovementioned plurality of features and the first plurality of feature values 216 are shown for exemplary purpose and should not be construed as limitations to the scope of the disclosure.

The machine learning engine 208 may be further configured to segregate the first plurality of feature values 216 into a first plurality of clusters 218. The machine learning engine 208 may segregate the first plurality of feature values 216 into the first plurality of clusters 218 based on one or more clustering algorithms such as K-means clustering algorithm, agglomerative hierarchical clustering algorithm, or the like. In one exemplary scenario, the machine learning engine 208 may be further configured to obtain a curve indicating the historical discharge voltage of the battery 116 based on the plurality of moving average values and the plurality of moving standard deviation values associated with the battery 116. Similarly, such curves are obtained for historical discharge voltage of the batteries of the other vehicles. The machine learning engine 208 may be configured to segregate the first plurality of feature values 216 based on one of a slope and an intercept of each of the curves indicating the historical discharge voltage of the battery 116 and the other batteries. The machine learning engine 208 may be further configured to label the first plurality of clusters 218, for example, good, bad, and very bad. In an example, when an initial value of the slope is less than or equal to "12", feature values associated therewith is segregated in the first cluster and labelled as "a good battery". In another example, when an initial value of the slope is less than "11.5", feature values associated therewith is segregated in the second cluster and labelled as "a bad battery". In an example, when a final value of the slope is less than or equal to "9.5", feature values associated therewith may be segregated in the third cluster and labelled as "a very bad battery". The machine learning engine 208 may be further configured to store the first plurality of features, the first plurality of feature values 216, and the first plurality of clusters 218 in the memory 202.

The machine learning engine 208 may be configured to train the classifier 210 based on the first plurality of clusters 218. For example, the machine learning engine 208 may input the first plurality of clusters 218 to the classifier 210 and the classifier 210 may correlate each cluster with the feature values in the corresponding cluster. In the current embodiment, for the sake of brevity, training data (i.e., the plurality of clusters 218) has been shown to correspond to a sample size of two (i.e., two vehicles 102 and 201). However, in an actual implementation, the training data may correspond to a large sample size (e.g., a sample size of a thousand vehicles, ten thousand vehicles, or a million vehicles). The machine learning engine 208 may train the classifier 210 using one or more classification algorithms such as logistic regression classification algorithm, or the like. The machine learning engine 208 may train the classifier 210 to determine the health status of the battery (e.g., the battery 116). The machine learning engine 208 may be further configured to train the classifier 210 to determine a pattern of change in the health status of the battery 116 based on the pattern of change observed in discharge voltages of the battery 116. Examples of the classifier 210 may include but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier, a deep learning based classifier, or a neural network based classifier. The machine learning engine 208 may further train and validate the classifier 210 based on the vehicle data received from the vehicles 102 and 201, and the historical maintenance data of the vehicles 102 and 201 obtained from the maintenance database 108.

The vehicle data of the vehicle 102 may include the vehicle model, the make of the vehicle 102, the vehicle manufacturing year, and the city of operation of the vehicle 102. For training the classifier 210 further based on the vehicle data of the vehicles 102 and 201, the machine learning engine 208 may be configured to associate feature values in each of the first plurality of clusters 218 with corresponding vehicle data. Thus, the classifier 210 learns a correlation between vehicle data and features values. In an example, based on the vehicle data and the first plurality of clusters 218, the classifier 210 may learn that the moving average values of discharge voltage is greater in older vehicles as compared to new vehicles. Similarly, the classifier 210 may learn that the moving average values of discharge voltage for vehicles operating in 1-tier cities is greater than the moving average values of discharge voltage for vehicles operating in 2-tier cities.

The historical maintenance data of the vehicle 102 may include pre-maintenance data associated with the set of parameters 212, a maintenance action taken for troubleshooting an issue associated with batteries of various vehicles (e.g., the vehicle 102), and post-maintenance data associated with the set of parameters 212. During validation of the classifier 210, the machine learning engine 208 may provide the pre-maintenance data of a battery (e.g., the battery 116) as an input to the trained classifier 210. The trained classifier 210 may output the health status of the battery 116 and a troubleshoot suggestion associated therewith. The machine learning engine 208 may compare the output of the trained classifier 210 with the maintenance action included in the historical maintenance data to generate a validation output. The validation output is used as a feedback to improve the accuracy level of the trained classifier 210. In an example, the pre-maintenance data of the vehicle 102 may indicate that the battery 116 had a very high discharge voltage, and thus a repair maintenance action was taken at the maintenance center 106 to troubleshoot the very high discharge voltage of the battery 116. The pre-maintenance data indicating the very high discharge voltage is provided to the trained classifier 210. The trained classifier 210 may be configured to analyze the pre-maintenance data and observe the high discharge voltage of the battery 116. Therefore, the trained classifier 210 may generate an output indicating the bad health of the battery 116. However, the trained classifier 210 may not suggest a repair of the battery 116. Thus, the validation output, i.e. a difference between the output of the trained classifier 210 and the maintenance action is communicated as the feedback to the trained classifier 210. Based on the feedback, the accuracy level of the trained classifier 210 is improved.

Figure 2B:
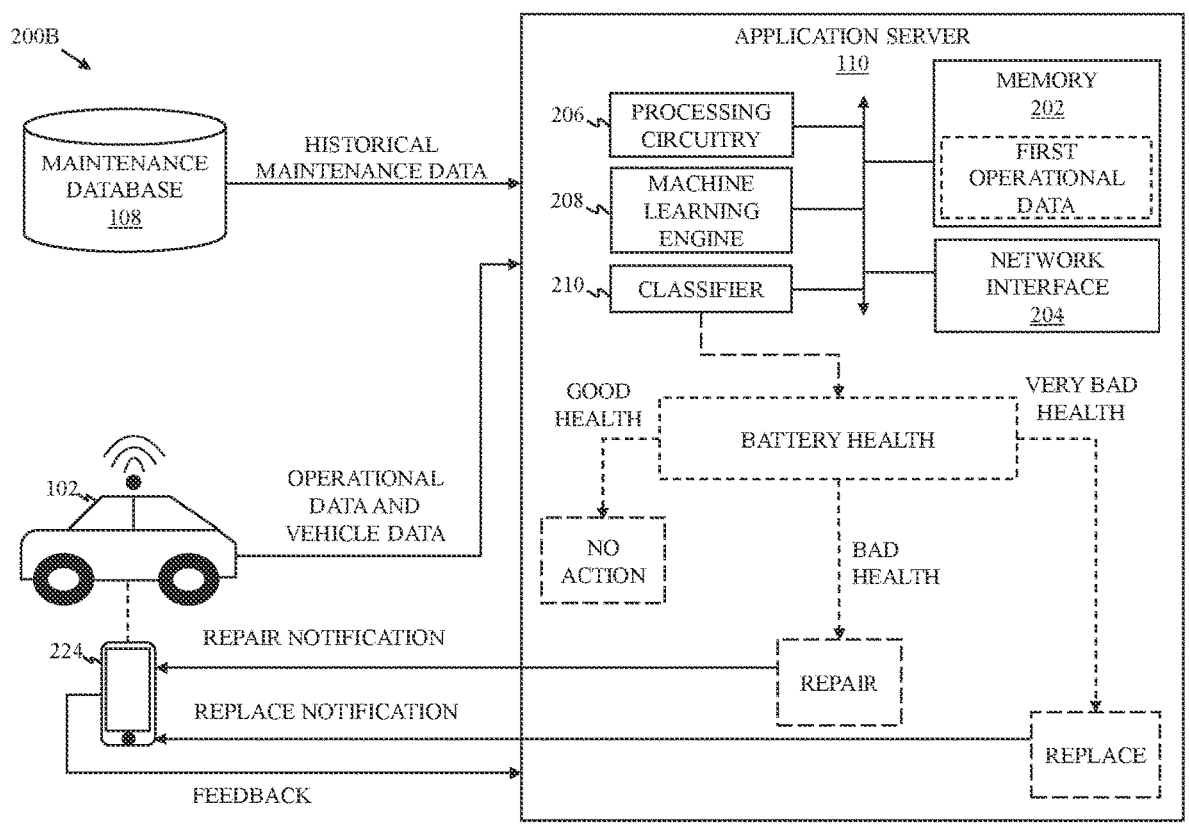
FIG. 2B is a block diagram that illustrates an exemplary scenario for determining a health status of a battery of a vehicle, in accordance with an exemplary embodiment of the disclosure.

FIG. 2B is a schematic diagram that illustrates an exemplary scenario 200B for determining a health status of a battery of a vehicle, in accordance with an exemplary embodiment of the disclosure. The application server 110 may include the memory 202, the network interface 204, the processing circuitry 206, the machine learning engine 208, and the trained classifier 210. For the sake of brevity, the implementation mode of the application server 110 is explained with respect to the vehicle 102. However, the application server 110 may utilize the trained classifier 210 to determine the health status of a battery of any vehicle irrespective of make, model, age, or the like of the vehicle.

In the implementation mode, the application server 110 may be configured to receive, from the telematics device 104, the real-time or near real-time operational data (i.e., the second operational data) for the first set of parameters 212 associated with the battery 116 and the vehicle data of the vehicle 102. In one embodiment, the machine learning engine 208 may provide the second operational data as input to the trained classifier 210. From the second operational data, the trained classifier 210 may be configured to obtain a new plurality of feature values for the first plurality of features. In another embodiment, the second operational data may be processed by the machine learning engine 208 for obtaining the new plurality of feature values for the first set of parameters 212 and the new plurality of feature values may be provided as input to the classifier 210.

The trained classifier 210 may be configured to classify the second operational data (i.e., the new plurality of feature values) into one of the first plurality of clusters 218. The health status of the battery 116 is determined based on the output of the trained classifier 210. For example, when the trained classifier 210 classifies the second operational data into the first cluster that is associated with good health status, the output of the classifier 210 indicates good health status of the battery 116. In another example, the trained classifier 210 may classify the second operational data into the second cluster that is associated with bad health status. Thus, the output of the classifier 210 indicates bad health status of the battery 116. In another example, the trained classifier 210 may classify the second operational data into the third cluster that is associated with very bad health status. Thus, the output of the trained classifier 210 indicates very bad health status of the battery 116.

Further, based on the output of the trained classifier 210, the processing circuitry 206 may be configured to communicate a notification to the user device 224 associated with the vehicle 102. Examples of the user device 224 may include, but are not limited to a tablet, a computer, a laptop, a mobile phone. The user device 224 may be accessible to the driver of the vehicle 102. In an embodiment, when the health status of the battery 116 is good, no action is recommended. Therefore, the application server 110 does not communicate any notification to the user device 224. In another embodiment, when the health status of the battery 116 is bad, a repair of the battery 116 is recommended. Therefore, the application server 110 communicates a repair notification to the user device 224. In another embodiment, when the health status of the battery 116 is very bad, a replacement of the battery 116 is recommended. Therefore, the application server 110 communicates a replacement notification to the user device 224.

In an embodiment, the user device 224 may be configured to communicate first voice data of the driver, as feedback, to the application server 110. The first voice data may indicate an assessment of the functioning of the battery 116 to the application server 110. For example, the first voice data may include a speech message recorded by the driver, indicating a very high discharge rate of the battery 116. In another embodiment, the feedback regarding the functioning of the battery 116 may be communicated to the application server 110 based on a selection performed by the driver from one or more options (e.g., "Good functioning", "Below par functioning", "Bad functioning", or "Very bad functioning") presented on a display screen of the user device 224. The feedback may be used to ensure that the health status determined by the trained classifier 210 is in line with driver's experience with the vehicle 102. For the sake of brevity, it is assumed that the first voice data is communicated to the application server 110. The processing circuitry 206 may include or work in conjunction with a natural language processing (NLP) engine (not shown) to decipher the speech message included in the first voice data. The processing circuitry 206 may communicate the deciphered speech message to the machine learning engine 208. If the deciphered speech message indicates that the functioning of the battery 116 is "below par", "bad", or "very bad", the processing circuitry 206 may communicate a message to the user device 224, requesting the driver to visit the maintenance center 106 for servicing the battery 116.

Based on the message, the vehicle 102 may be taken to the maintenance center 106 for servicing. Following a servicing of the battery 116, the maintenance system 122 in the maintenance center 106 may communicate a service log to the maintenance database 108 for storing therein. The service log may indicate the pre-maintenance data, the maintenance action taken for troubleshooting an issue with the battery 116, and post-maintenance data associated with the battery 116. The maintenance database 108 may communicate corresponding service data to the application server 110. The processing circuitry 206 may receive the corresponding service data and communicate the corresponding service data to the machine learning engine 208. Based on the deciphered speech message and the corresponding service data, the machine learning engine 208 may validate an output (i.e., the determined health status of the battery 116) of the classifier 210 and tag the output as a "true negative" (i.e., bad health status determined correctly) or a "false negative" (i.e., bad health status determined wrongly) as per a result of the validation. If the speech message indicates that the functioning of the battery 116 is "below par", "bad", or "very bad" and the corresponding service data indicates the repair and/or the replacement of the battery 116, the machine learning engine 208 tags the output as a true negative. However, if the speech message indicates that the functioning of the battery 116 is "good" and the corresponding service data indicates no repair and/or replacement of the battery 116, the machine learning engine 208 tags the output as a false negative.

Based on the tagging (i.e., the result of the validation) of the output and reinforcement learning techniques, the machine learning engine 208 may re-train the classifier 210 to improve an accuracy of the classifier 210. In one example, the machine learning engine 208 may modify or update the weights assigned to the first plurality of features for improving the accuracy of the classifier 210.

In an embodiment, the trained classifier 210 may be further configured to determine the remaining useful life of the battery 116 based on the historical maintenance data, the second operational data, and the output of the trained classifier 210. For example, based on the trend observed in the first dataset 214, the classifier 210 may be further configured to identify a third time-interval for one of a change of the good health status of the battery 116 to the bad health status or a change of the bad health status of the battery 116 to very bad health status. The third time-interval may correspond to the remaining useful life of the battery 116. For example, the battery 116 may currently have the good health status and may deteriorate to the bad health status after 60 days as per the determination of the trained classifier 210. In such a scenario, the remaining useful life of the battery 116 is determined to be 60 days. The battery 116 may require maintenance after the remaining useful life i.e. the third time-interval. In another example, the third time-interval for the change of bad health status of the battery 116 to very bad health status may be 30 days.

In one embodiment, the application server 110 may be configured to collect the second operational data from the vehicle 102 based on the vehicle model, the make of the vehicle, the vehicle manufacturing year, and the city of operation of the vehicle 102. For example, as per the vehicle model and the vehicle make, the vehicle 102 may be known to work ideally for 30 days after replacement of the battery 116. Therefore, the application server 110 may receive the second operational data from the vehicle 102 after 30 days from the replacement of the battery 116. In another example, as per the vehicle model and the vehicle make, the vehicle 102 may be known to break down within 30 days of repair of the battery 116. Therefore, the application server 110 may receive the second operational data from the vehicle 102 on a per day basis after the repair of the battery 116 to periodically monitor the health status of the battery 116.

Figure 3A:
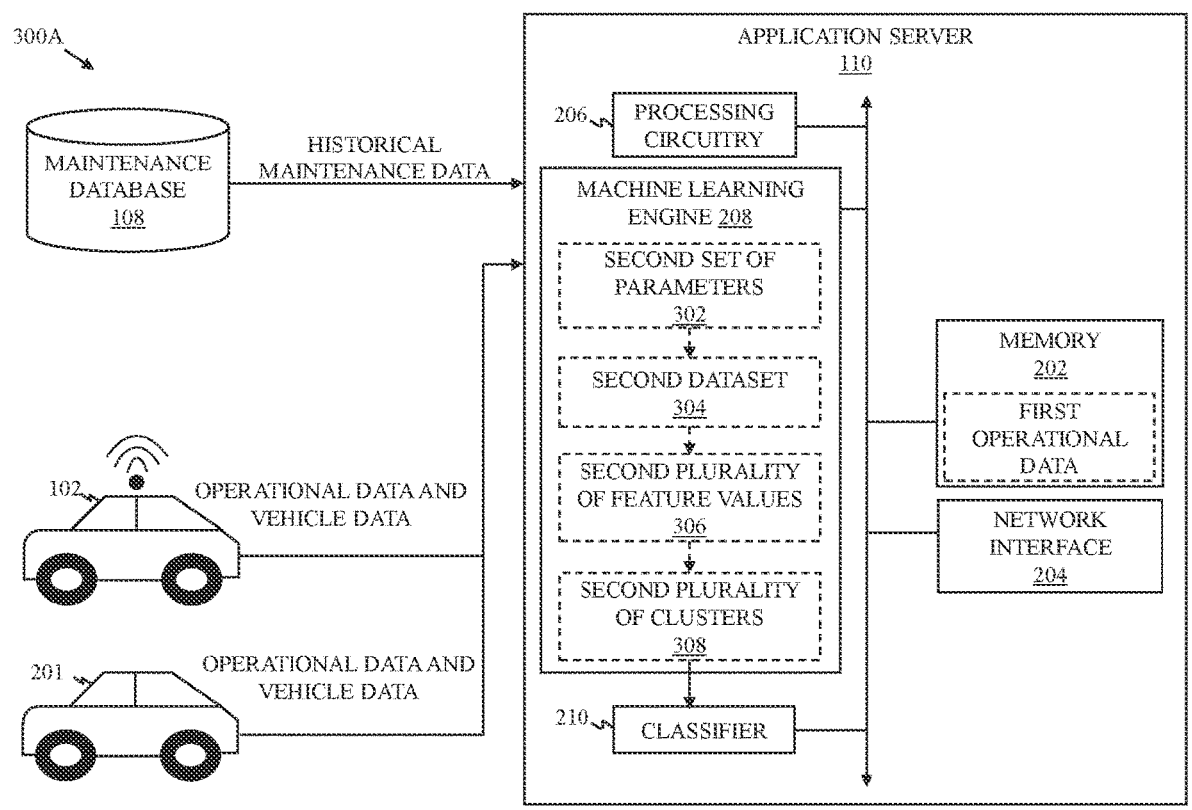
FIG. 3A is a schematic diagram that illustrates an exemplary scenario for training a classifier for predictive maintenance of an alternator of a vehicle, in accordance with an exemplary embodiment of the disclosure.

FIG. 3A is a schematic diagram that illustrates an exemplary scenario 300A for training the classifier 210 for predictive maintenance of an alternator of a vehicle, in accordance with an exemplary embodiment of the disclosure. The application server 110 may include the memory 202, the network interface 204, the processing circuitry 206, the machine learning engine 208, and the classifier 210. Functions of the memory 202, the network interface 204, the processing circuitry 206, the machine learning engine 208, and the classifier 210 are similar to those described in FIG. 2A.

The memory 202 may be configured to store the first operational data associated with the alternator 118 of the vehicle 102 and/or alternators of other vehicles. The memory 202 may be accessible by the processing circuitry 206, the machine learning engine 208, and the classifier 210.

The processing circuitry 206 may include suitable logic, circuitry, interfaces, and/or code, executable by the circuitry, that may be configured to execute the instructions stored in the memory 202 to perform one or more operations for determining the health status of an alternator (e.g., the alternator 118).

When the application server 110 is operating in the training mode, the processing circuitry 206 may employ a feature or variable selection technique to select a second set of parameters 302 that may have a causal relationship (e.g., direct causal relationship or indirect causal relationship) or a high degree of correlation with the health status of an alternator in a vehicle. The processing circuitry 206 may be configured to receive operational data for the second set of parameters 302 associated with the alternator 118 of the vehicle 102 and alternators of the other vehicles. The processing circuitry 206 may be configured to receive the operational data for the second set of parameters 302 from the telematics device 104 of the vehicle 102 and telematics devices of the other vehicles, via the communication network 112. The processing circuitry 206 may be further configured to collect the operational data over the first time-interval. The operational data collected over the first time-interval is referred to as the first operational data. The processing circuitry 206 may be further configured to store the collected first operational data as historical operational data in the memory 202 or a cloud database server (not shown). The processing circuitry 206 may be further configured to receive the vehicle data and the historical maintenance data of the vehicles 102 and 201. The historical maintenance data may be received from the maintenance database 106.

The second set of parameters 302 that are indicators of a health of an alternator (e.g., the alternator 118) and for which the first operational data is collected may include various DTCs associated with a corresponding vehicle, voltage data associated with the alternator, an engine dataset associated with a corresponding engine (e.g., the engine 114), and the past count of each DTC. The voltage data associated with an alternator (e.g., the alternator 118) may include an average voltage over, for example 28 days, a deviation of minimum voltage over, for example 28 days, an average maximum voltage over, for example 7 days, and an average minimum voltage over, for example 28 days. The engine dataset associated with an engine (e.g., the engine 114) may include an average engine ON time over, for example 7 days, a past count of ON engine status, and a past count of OFF engine status. Further, the past count of the DTCs may indicate a frequency of an issue occurring in a vehicle (e.g., the vehicle 102). In an example, the DTCs may be one of a system voltage malfunction code (P0560), a system voltage low code (P0562), a system voltage high code (P0563), or the like.

The machine learning engine 208 may be further configured to select a second dataset 304 from the first operational data. In an embodiment, the second dataset 304 may include various DTCs associated with a corresponding vehicle, a value of an average voltage over, for example 28 days, a value of deviation of minimum voltage over, for example 28 days, a value of an average maximum voltage over, for example 7 days, and a value of an average minimum voltage over, for example 28 days. The engine dataset associated with the engine 114 may include a value of an average engine ON time over, for example 7 days, a past count of ON engine status, and a past count of OFF engine status.

The machine learning engine 208 may be further configured to process and analyze the second dataset 304 to obtain a second plurality of feature values 306 corresponding to a second plurality of features. Each feature of the second plurality of features may be selected to capture a change, a trend, or a pattern in the second dataset 304 across various time periods (e.g., days, weeks, months, years, or the like) over the first time-interval. In other words, the machine learning engine 208 processes the second dataset 304 to determine historical pattern of voltage level, performance, and issues associated with the alternators (e.g., the alternator 118). Beneficially, the historical pattern provides information regarding deviation in performance of the alternator 118 over a period of time.

In one example, a first example of the second plurality of features may include a rolling average for the average engine ON time over 7 days, a second example of the second plurality of features may include a rolling standard deviation of the average voltage over 28 days, and a third example of the second plurality of features may include a cumulative sum of the past count of each DTC. Thus, the machine learning engine 208 may process the second dataset 304 and obtain the plurality of rolling average values, the plurality of rolling standard deviation values, and the plurality of cumulative sum values for each of the second plurality of features. In an exemplary scenario, an average maximum voltage of an alternator of a vehicle over a week may include values $x_1$, $x_2$, $x_3$, $x_4$, $x_5$, $x_6$, and $x_7$. Thus, a rolling average value of the average maximum voltage for a day 1 is determined based on rolling average ($x_1$), rolling average value of the average maximum voltage for a day 2 is determined based on rolling average ($x_1$, $x_2$), and rolling average value of the average minimum voltage for day 3 is determined based rolling average ($x_1$, $x_2$, $x_3$). Similarly, rolling average values for each of day 4 to day 7 are obtained based on rolling average across average minimum voltage of previous days and current day. Further, deviation in minimum voltage of an alternator of a vehicle over a week may include values $x_1$, $x_2$, $x_3$, $x_4$, $x_5$, $x_6$, and $x_7$. Thus, a rolling standard deviation value of the deviation in minimum voltage for a day 1 is determined based on rolling standard deviation ($x_1$), rolling standard deviation value of the deviation in minimum voltage for a day 2 is determined based on rolling standard deviation ($x_1$, $x_2$), and rolling standard deviation value of the deviation in minimum voltage for day 3 is determined based rolling standard deviation ($x_1$, $x_2$, $x_3$). Similarly, based on the second dataset 304, the plurality of rolling average values, the plurality of rolling standard deviation values, and the plurality of cumulative sum values are obtained for the other vehicles. The obtained plurality of rolling average values, the plurality of rolling standard deviation values, and the plurality of cumulative sum values constitute the second plurality of feature values 306.

In one embodiment, each feature of the second plurality of features may be assigned a weight corresponding to a strength of a relationship of correlation or causation between the feature and the health status of the alternator. For example, the second feature may be assigned a higher weight than the first feature, based on determination by the machine learning engine 208 that the rolling standard deviation of the average voltage is a better predictor of the health status of the alternator than a cumulative sum value of the past count of engine OFF status. It will be apparent to a person of ordinary skill in the art that the abovementioned second plurality of features and the second plurality of feature values 306 are for exemplary purpose and should not be construed as limitations to the scope of the disclosure.

The machine learning engine 208 may be further configured to segregate the second plurality of feature values 306 into a second plurality of clusters 308. The machine learning engine 208 may segregate the second plurality of feature values 306 into the second plurality of clusters 308 based on one or more clustering algorithms such as K-means clustering algorithm, agglomerative hierarchical clustering algorithm, or the like. In one exemplary scenario, the machine learning engine 208 may be further configured to obtain a curve indicating historical performance of the alternator 118. The curve may be obtained based on the second plurality of feature values 306. Similarly, such curves depicting historical performance of the alternators of the other vehicles are obtained by the machine learning engine 208. The machine learning engine 208 may be configured to segregate the second plurality of feature values 306 based on one of a slope and an intercept of each of the curves indicating the historical performance of the alternator 118 and other alternators. The machine learning engine 208 may be further configured to label the second plurality of clusters 308, for example, good, bad, and very bad. The machine learning engine 208 may be further configured to store the second plurality of features, the second plurality of feature values 306, and the second plurality of clusters 308 in the memory 202.

The machine learning engine 208 may be configured to train the classifier 210 based on the second plurality of clusters 308. For example, the machine learning engine 208 may input the second plurality of clusters 308 to the classifier 210 and the classifier 210 may correlate each cluster with the feature values in the corresponding cluster. In the current embodiment, for the sake of brevity, training data (i.e., the second plurality of clusters 308) has been shown to correspond to a sample size of two (i.e., two vehicles 102 and 201). However, in an actual implementation, the training data may correspond to a large sample size (e.g., a sample size of a thousand vehicles, ten thousand vehicles, or a million vehicles). The machine learning engine 208 may train the classifier 210 using one or more classification algorithms such as logistic regression classification algorithm, or the like. The machine learning engine 208 may train the classifier 210 to determine the health status of an alternator (e.g., the alternator 118). The machine learning engine 208 may be further configured to train the classifier 210 to determine a pattern of change in the health status of the alternator 118 based on the pattern of change observed in the performance of the alternator 118.

The machine learning engine 208 may further train and validate the classifier 210 based on the vehicle data received from the vehicles 102 and 201, and the historical maintenance data of the vehicles 102 and 201 obtained from the maintenance database 108.

The performance of the alternator 118 and other alternators may vary based on the vehicle data. In one example, the vehicle 102 may be running in a geographical region having a very frosty winter. The vehicle 102 may require to keep the engine 114 and one or more electronic components powered up while on a stop-over during a trip to avoid shutting down of the vehicle 102. Therefore, a low average voltage of the alternator 118 may be due to weather conditions of the geographical region. Thus, the classifier 210 learns a correlation between the vehicle data and the features values segregated in each of the second plurality of clusters 308.

The historical maintenance data of the vehicle 102 may include pre-maintenance data associated with the set of parameters, a maintenance action taken for troubleshooting an issue associated with alternators of various vehicles (e.g., the vehicle 102), and post-maintenance data associated with the set of parameters. During validation of the classifier 210, the machine learning engine 208 may provide the pre-maintenance data of an alternator (e.g., the alternator 118) as an input to the trained classifier 210. The trained classifier 210 may output the health status of the alternator 118 and a troubleshoot suggestion associated therewith. The machine learning engine 208 may compare the output of the trained classifier 210 with the maintenance action included in the historical maintenance data to generate a validation output. The validation output is used as a feedback to improve the accuracy level of the trained classifier 210. In an example, the pre-maintenance data of the vehicle 102 may indicate that the alternator 118 had a very low average voltage, and thus a repair maintenance action was taken at the maintenance center 106 to troubleshoot the very low average voltage of the alternator 118. The pre-maintenance data indicating the very low average voltage is provided to the trained classifier 210. The trained classifier 210 may be configured to analyze the pre-maintenance data and observe the very low average voltage of the alternator 118. Therefore, the trained classifier 210 may generate an output indicating the bad health of the alternator 118. However, the trained classifier 210 may not suggest a repair of the alternator 118. Thus, the validation output, i.e. a difference between the output of the classifier 210 and the maintenance action is communicated as the feedback to the trained classifier 210. Based on the feedback, the accuracy level of the trained classifier 210 is improved.

Figure 3B:
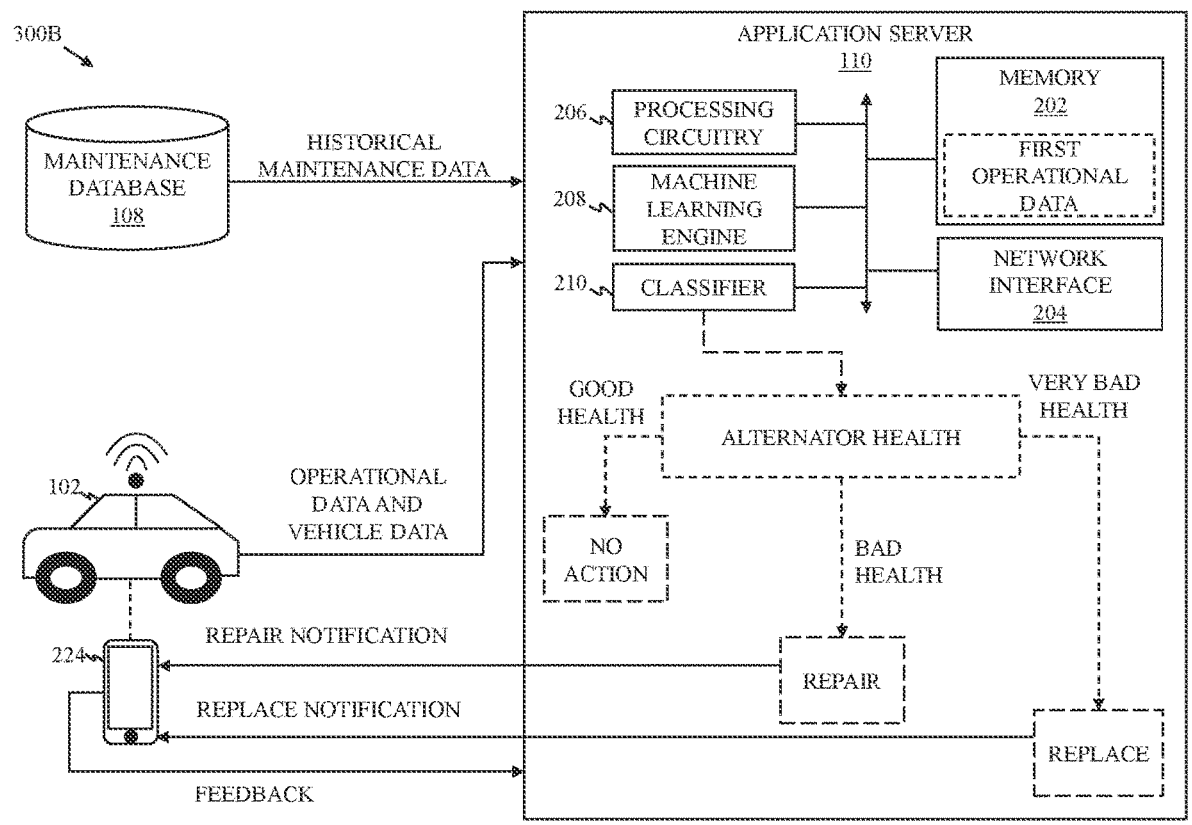
FIG. 3B is a schematic diagram that illustrates an exemplary scenario for determining a health status of an alternator of the vehicle, in accordance with an exemplary embodiment of the disclosure.

FIG. 3B is a schematic diagram that illustrates an exemplary scenario 300B for determining a health status of an alternator of a vehicle, in accordance with an exemplary embodiment of the disclosure. The application server 110 includes the memory 202, the network interface 204, the processing circuitry 206, the machine learning engine 208, and the classifier 210 as described in the foregoing description of FIG. 3A.

For the sake of brevity, the implementation mode of the application server 110 is explained with respect to the alternator 118 of the vehicle 102. However, the application server 110 may utilize the trained classifier 210 to determine the health status of an alternator of any vehicle irrespective of make, model, age, or the like of the vehicle.

In the implementation mode, the application server 110 may be configured to receive, from the telematics device 104, the second operational data (i.e., the real-time or near real-time operational data) for the second set of parameters 302 associated with the alternator 118 and the vehicle data of the vehicle 102. In one embodiment, the machine learning engine 208 may provide the second operational data as input to the trained classifier 210. In another embodiment, the second operational data may be processed to obtain a new plurality of feature values for the second plurality of features and the new plurality of feature values may be provided as input to the classifier 210.

The trained classifier 210 may be configured to classify the second operational data (i.e., the new plurality of feature values) into one of the second plurality of clusters 308. The health status of the alternator 118 is determined based on the output of the trained classifier 210. For example, when the trained classifier 210 classifies the second operational data into the first cluster that is associated with good health status, the output of the classifier 210 indicates good health status of the alternator 118. In another example, the trained classifier 210 may classify the second operational data into the second cluster that is associated with bad health status. Thus, the output of the classifier 210 indicates bad health status of the alternator 118. In another example, the trained classifier 210 may classify the second operational data into the third cluster that is associated with very bad health status. Thus, the output of the trained classifier 210 indicates very bad health status of the alternator 118.

Further, based on the output of the trained classifier 210, the processing circuitry 206 may be configured to communicate a notification to the user device 224 associated with the vehicle 102. The user device 224 may be accessible to the driver of the vehicle 102. In an embodiment, when the health status of the alternator 118 is good, no action is recommended. Therefore, the application server 110 does not communicate any notification to the user device 224. In another embodiment, when the health status of the alternator 118 is bad, a repair of the alternator 118 is recommended. Therefore, the application server 110 communicates a repair notification to the user device 224. In another embodiment, when the health status of the alternator 118 is very bad, a replacement of the alternator 118 is recommended. Therefore, the application server 110 communicates a replacement notification to the user device 224.

In an embodiment, the user device 224 may be configured to communicate second voice data of the driver, as feedback, to the application server 110. The feedback may be regarding one of a performance of the alternator 118, an operating environment of the alternator 118, a confirmation regarding the repair or replacement notification, or the like. In another embodiment, the feedback regarding the functioning of the alternator 118 may be communicated to the application server 110 based on a selection performed by the driver from one or more options (e.g., "Good functioning", "Below par functioning", "Bad functioning", or "Very bad functioning") presented on a display screen of the user device 224. The feedback may be used to ensure that the health status determined by the trained classifier 210 is in line with driver's experience with the vehicle 102. For the sake of brevity, it is assumed that the second voice data is communicated to the application server 110. The processing circuitry 206 may include or work in conjunction with a natural language processing (NLP) engine (not shown) to decipher the speech message included in the second voice data. The processing circuitry 206 may communicate the deciphered speech message to the machine learning engine 208. If the deciphered speech message indicates that the functioning of the alternator 118 is "below par", "bad", or "very bad", the processing circuitry 206 may communicate a message to the user device 224, requesting the driver to visit the maintenance center 106 for servicing the alternator 118.

Based on the message, the vehicle 102 may be taken to the maintenance center 106 for servicing. Following a servicing of the alternator 118, the maintenance system 122 in the maintenance center 106 may communicate a service log to the maintenance database 108 for storing therein. The service log may indicate the pre-maintenance data, the maintenance action taken for troubleshooting an issue with the alternator 118, and post-maintenance data associated with the alternator 118. The maintenance database 108 may communicate corresponding service data to the application server 110. The processing circuitry 206 may receive the corresponding service data and communicate the corresponding service data to the machine learning engine 208. Based on the deciphered speech message and the corresponding service data, the machine learning engine 208 may validate an output (i.e., the determined health status of the alternator 118) of the classifier 210 and tag the output as a "true negative" (i.e., bad health status determined correctly) or a "false negative" (i.e., bad health status determined wrongly) as per a result of the validation. If the speech message indicates that the functioning of the battery 116 is "below par", "bad", or "very bad" and the corresponding service data indicates the repair and/or the replacement of the alternator 118, the machine learning engine 208 tags the output as a true negative. However, if the speech message indicates that the functioning of the alternator 118 is "good" and the corresponding service data indicates no repair and/or replacement of the alternator 118, the machine learning engine 208 tags the output as a false negative.

Based on the tagging (i.e., the result of the validation) of the output and reinforcement learning techniques, the machine learning engine 208 may re-train the classifier 210 to improve an accuracy of the classifier 210. In one example, the machine learning engine 208 may modify or update the weights assigned to the first plurality of features for improving the accuracy of the classifier 210.

In an embodiment, the trained classifier 210 may be further configured to determine the remaining useful life of the alternator 118 based on the historical maintenance data, the second operational data, and the output of the trained classifier 210. For example, based on the trend observed in the second dataset 304, the classifier 210 may be further configured to identify a fourth time-interval for one of a change of good health status of the alternator 118 to bad health status or the bad health status of the alternator 118 to a very bad health status. The fourth time-interval may correspond to the remaining useful life of the alternator 118. The alternator 118 may require a maintenance after the remaining useful life i.e. the fourth time-interval. For example, the alternator 118 may currently have the good health status and may deteriorate to the bad health status after 28 days as per the determination of the trained classifier 210. In such a scenario, the remaining useful life of the alternator 118 is determined to be 28 days. In another example, the fourth time-interval for the change of bad health status of the alternator 118 to very bad health status may be 20 days.

In one embodiment, the application server 110 may be configured to collect the second operational data from the vehicle 102 based on the vehicle model, the make of the vehicle, the vehicle manufacturing year, and the city of operation of the vehicle 102. For example, as per the vehicle model and the vehicle make, the vehicle 102 may be known to work ideally for 30 days after replacement of the alternator 118. Therefore, application server 110 may receive the second operational data from the vehicle 102 after 30 days from the replacement of the alternator 118. In another example, as per the vehicle model and the vehicle make, the vehicle 102 may be known to break down within 30 days of repair of the alternator 118. Therefore, the application server 110 may receive the second operational data from the vehicle 102 on a per day basis after the repair of the alternator 118 to periodically monitor the health of the alternator 118.

Figure 4A:
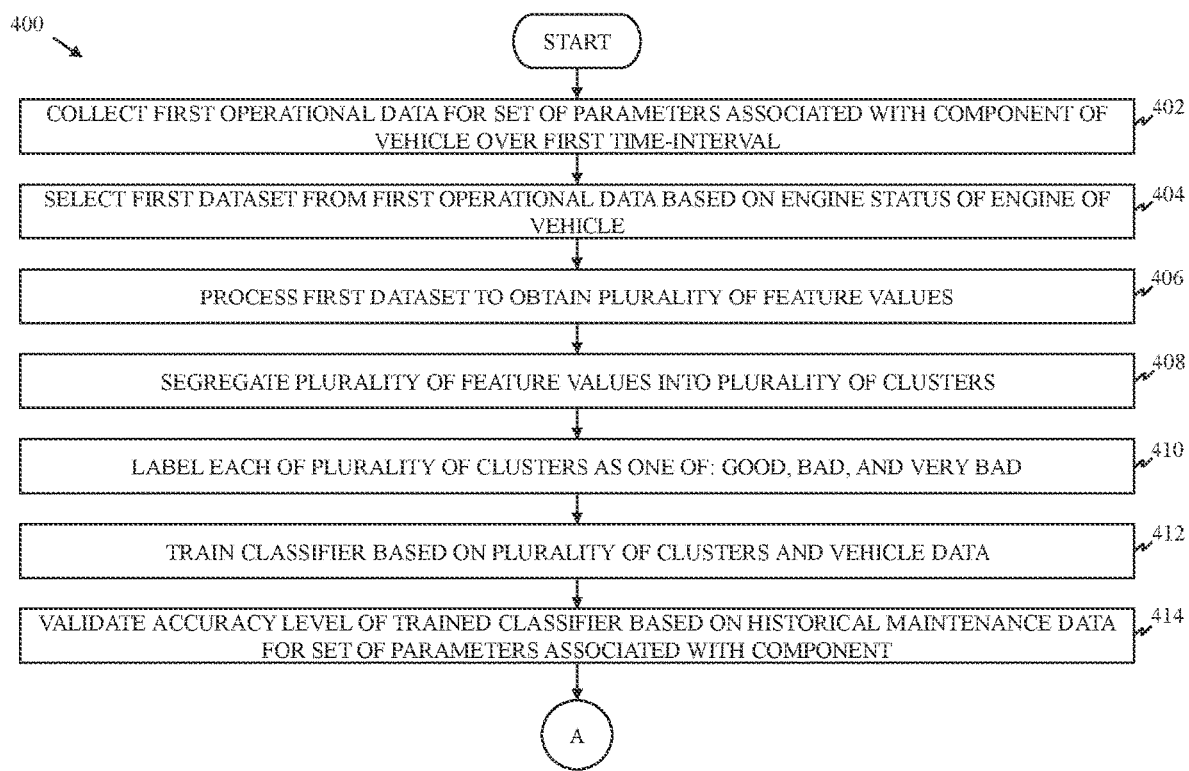
FIGS. 4A and 4B, collectively represent a flow chart that illustrates a method for predictive maintenance of a component of a vehicle, in accordance with an exemplary embodiment of the disclosure.
Figure 4B:
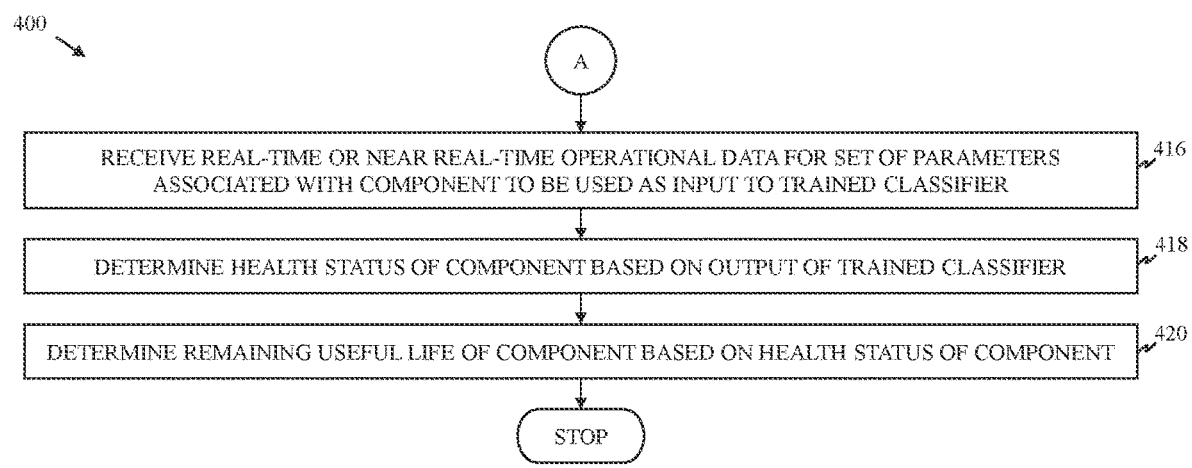

FIGS. 4A and 4B, collectively represent a flow chart 400 that illustrates a method for predictive maintenance of the component of the vehicle 102, in accordance with an exemplary embodiment of the disclosure. The component may be the battery 116 or the alternator 118 of the vehicle 102. For the sake of brevity, the functionalities of training the classifier 210 and determining the health status of the component of the vehicle 102 are shown to be implemented at a single entity (e.g., the application server 110). However, in another embodiment, the functionalities of training the classifier 210 and determining the health status of the component of the vehicle 102 may be implemented at two different entities without deviating from the scope of the disclosure.

At 402, the first operational data for the set of parameters associated with the component is collected over the first time-interval from the telematics device 104 associated with the vehicle 102. The application server 110 may be configured to collect, from the telematics device 104, the first operational data for the set of parameters associated with the component. The application server 110 may be configured to collect the first operational data over the first time-interval. The set of parameters includes the engine status of the engine 114, the voltage data associated with the component, one or more DTCs associated with the component, the past count of each of the one or more diagnostic trouble codes, the engine ON/OFF count of the engine 114, the maximum and minimum voltage associated with the component, the average voltage associated with the component, the deviation of minimum voltage associated with the component, the average minimum voltage associated with the component, the average maximum voltage associated with the component, and the average engine ON time of the engine 114.

At 404, the dataset is selected from the first operational data based on the engine status of the engine 114 of the vehicle 102. The application server 110 may be configured to select, from the first operational data, the dataset based on the engine status of the engine 114 of the vehicle 102.

At 406, the selected dataset is processed to obtain the plurality of feature values. The application server 110 may be configured to process the selected dataset to obtain the plurality of feature values. In an embodiment, the plurality of feature values include one of the plurality of moving average values, the plurality of moving standard deviation values, the plurality of cumulative sum values, the plurality of rolling mean values, and the plurality of rolling standard deviation values obtained by processing the selected dataset.

At 408, the plurality of feature values are segregated into the plurality of clusters. The application server 110 may be configured to segregate the plurality of feature values into the plurality of clusters.

At 410, the plurality of clusters are labeled. The application server 110 may be configured to label the plurality of clusters as one of good, intermediate, bad, and very bad. The label may indicate a specific health status of the component.

At 412, the classifier 210 is trained based on the plurality of clusters to determine the health status of the component. The application server 110 may be configured to train the classifier 210 based on the plurality of clusters to determine the health status of the component. In an embodiment, the application server 110 may be configured to train the classifier 210 based on the vehicle data of the vehicle 102. The vehicle data includes the vehicle model, the make of the vehicle 102, the vehicle manufacturing year, and the city of operation of the vehicle 102.

At 414, the accuracy level of the trained classifier 210 is validated based on the vehicle data and the historical maintenance data for the set of parameters associated with the component. The application server 110 may be configured to validate the accuracy level of the trained classifier 210 based on the vehicle data and the historical maintenance data for the set of parameters associated with the component. The validation output is used as the feedback to improve the accuracy level of the trained classifier 210.

At 416, the real-time or near real-time operational data for the set of parameters associated with the component is received from the telematics device 104. The application server 110 may be configured to receive, from the telematics device 104, the real-time or near real-time operational data for the set of parameters associated with the component. The second operational data may be used as the input to the trained classifier 210.

At 418, the health status of the component is determined based on the output of the trained classifier 210 for the real-time or near real-time operational data. The application server 110 may be configured to determine the health status of the component based on the output of the trained classifier 210 for the real-time or near real-time operational data.

At 420, the remaining useful life of the component is determined based on the health status of the component. The application server 110 may be configured to determine the remaining useful life of the component based on the health status of the component.

Figure 5:
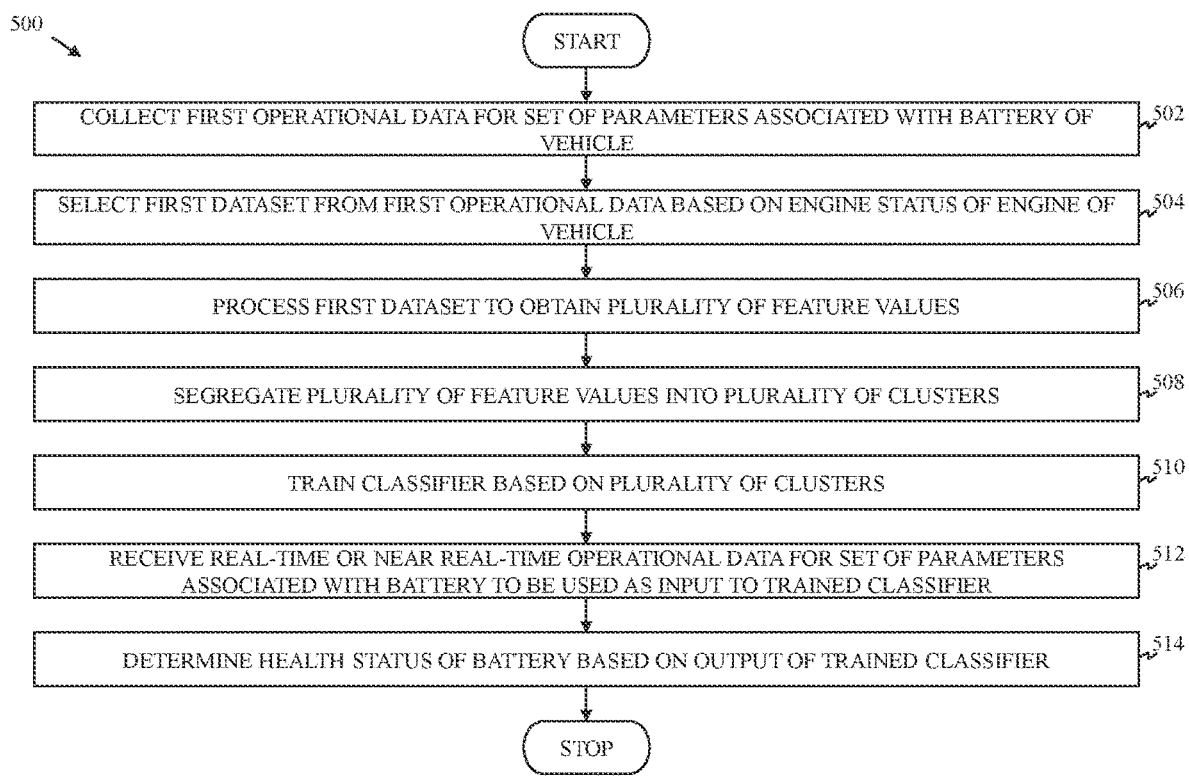
FIG. 5 is a flow chart that illustrates a method for predictive maintenance of a battery of a vehicle, in accordance with an exemplary embodiment of the disclosure.

FIG. 5 is a flow chart 500 that illustrates the method for predictive maintenance of the battery 116 of the vehicle 102, in accordance with an exemplary embodiment of the disclosure.

At 502, the first operational data for the first set of parameters 212 associated with the battery 116 is collected over the first time-interval from the telematics device 104 associated with the vehicle 102. The application server 110 may be configured to collect, from the telematics device 104, the first operational data for the first set of parameters 212 associated with the battery 116. The application server 110 may be configured to collect the first operational data over the first time-interval. The first set of parameters 212 may include the engine status of the engine 114 and the voltage data associated with the battery 116. The voltage data associated with the battery 116 may include the discharge voltage of the battery 116.

At 504, from the first operational data, the first dataset 214 is selected based on the engine status of the engine 114 of the vehicle 102. The application server 110 may be configured to select, from the first operational data, the first dataset 214 based on the engine status of the engine 114 of the vehicle 102.

At 506, the first dataset 214 is processed to obtain the first plurality of feature values 216. The application server 110 may be configured to process the first dataset 214 to obtain the first plurality of feature values 216. In an embodiment, the first plurality of feature values 216 include one of the plurality of moving average values and the plurality of moving standard deviation values obtained by processing the first dataset 214.

At 508, the first plurality of feature values 216 are segregated into the first plurality of clusters 218. The application server 110 may be configured to segregate the first plurality of feature values 216 into the first plurality of clusters 218.

At 510, the classifier 210 is trained based on the first plurality of clusters 218 to determine the health status of the battery 116. The application server 110 may be configured to train the classifier 210 based on the first plurality of clusters 218 to determine the health status of the battery 116. In an embodiment, the application server 110 may be configured to train the classifier 210 based on the vehicle data of the vehicle 102. The vehicle data may include the vehicle model, the make of the vehicle 102, the vehicle manufacturing year, and the city of operation of the vehicle 102. In another embodiment, the application server 110 may be further configured to validate the accuracy level of the trained classifier 210 based on the vehicle data and the historical maintenance data for the first set of parameters 212 associated with the battery 116. The validation output is used as the feedback to improve the accuracy level of the trained classifier 210.

At 512, from the telematics device 104, the real-time or near real-time operational data for the first set of parameters 212, to be used as input to the trained classifier 210, associated with the battery 116 is received. The application server 110 may be configured to receive, from the telematics device 104, the real-time or near real-time operational data for the first set of parameters 212 associated with the battery 116. The real-time or near real-time operational data is used as the input to the trained classifier 210.

At 514, the health status of the battery 116 is determined based on the output of the trained classifier 210 for the real-time or near real-time operational data. The application server 110 may be configured to determine the health status of the battery 116 based on the output of the trained classifier 210 for the real-time or near real-time operational data. In an embodiment, the application server 110 may be configured to determine the remaining useful life of the battery 116 based on the health status of the battery 116.

Figure 6:
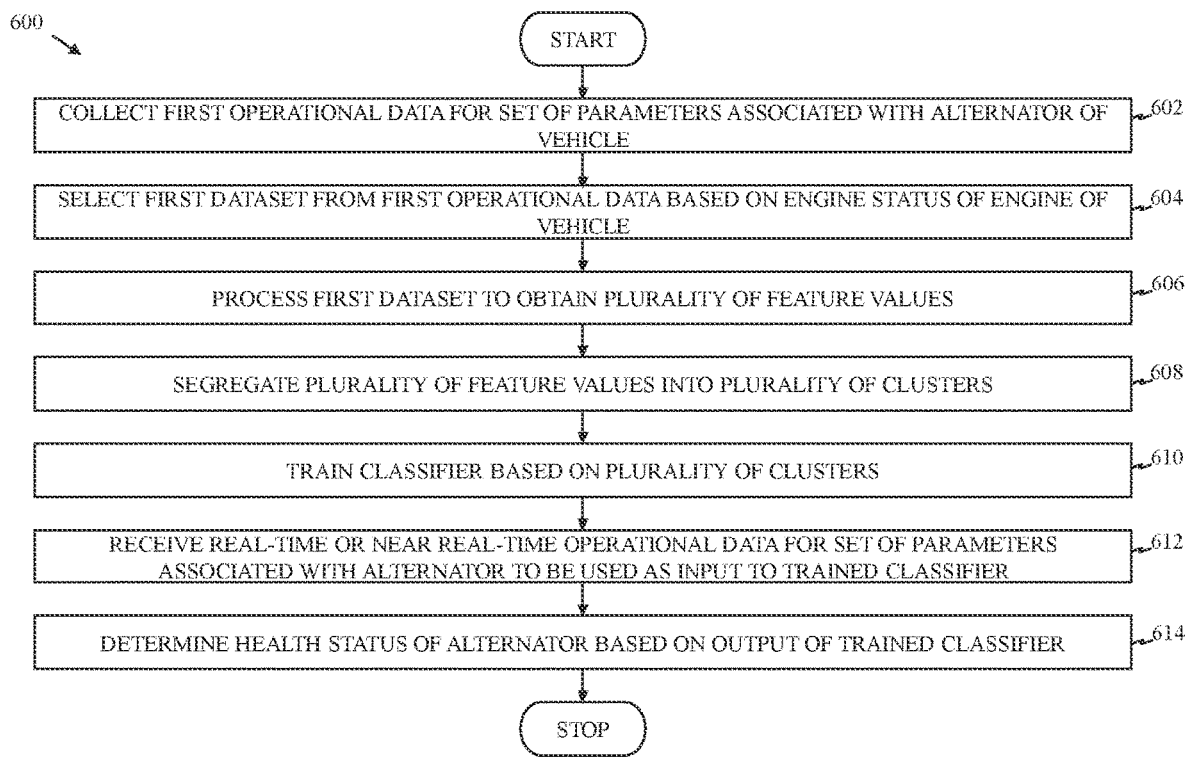
FIG. 6 is a flow chart that illustrates a method for predictive maintenance of an alternator of a vehicle, in accordance with an exemplary embodiment of the disclosure.

FIG. 6 is a flow chart 600 that illustrates the method for predictive maintenance of the alternator 118 of the vehicle 102, in accordance with an exemplary embodiment of the disclosure.

At 602, the first operational data for the second set of parameters 302 associated with the alternator 118 is collected over the first time-interval from the telematics device 104 associated with the vehicle 102. The application server 110 may be configured to collect, from the telematics device 104, the first operational data for the second set of parameters 302 associated with the alternator 118. The application server 110 may be configured to collect the first operational data over the first time-interval. In an embodiment, the second set of parameters 302 includes the engine status of the engine 114, the voltage data associated with the alternator 118, one or more DTCs associated with the alternator 118, the past count of each of the one or more DTCs, the engine ON/OFF count of the engine 114, the maximum and minimum voltage associated with the alternator 118, the average voltage associated with the alternator 118, the deviation of minimum voltage associated with the alternator 118, the average minimum voltage associated with the alternator 118, the average maximum voltage associated with the alternator 118, and the average engine ON time of the engine 114.

At 604, the second dataset 304 is selected from the first operational data, based on the engine status of the engine 114 of the vehicle 102. The application server 110 may be configured to select, from the first operational data, the second dataset 304 based on the engine status of the engine 114 of the vehicle 102.

At 606, the second dataset 304 is processed to obtain the second plurality of feature values 306. The application server 110 may be configured to process the second dataset 304 to obtain the second plurality of feature values 306. In an embodiment, the second plurality of feature values 306 include one of the plurality of cumulative sum values, the plurality of rolling mean values, and the plurality of rolling standard deviation values obtained by processing the second dataset 304.

At 608, the second plurality of feature values 306 are segregated into the second plurality of clusters 308. The application server 110 may be configured to segregate the second plurality of feature values 306 into the second plurality of clusters 308. At 610, the application server 110 may be configured to train the classifier 210 based on the second plurality of clusters 308 and the vehicle data to determine the health status of the alternator 118. In an embodiment, the application server 110 may be further configured to validate the accuracy level of the trained classifier 210 based on the vehicle data and historical maintenance data for the set of parameters associated with the alternator 118. The validation output may be used as the feedback to improve the accuracy level of the trained classifier 210. The vehicle data may include the vehicle model, the make of the vehicle 102, the vehicle manufacturing year, and the city of operation of the vehicle 102.

At 612, the real-time or near real-time operational data for the set of parameters associated with the alternator 118 is received from the telematics device 104. The application server 110 may be configured to receive, from the telematics device 104, the real-time or near real-time operational data for the second set of parameters 302 associated with the alternator 118. The real-time or near real-time operational data may be provided as the input to the trained classifier 210.

At 614, the health status of the alternator 118 is determined based on the output of the trained classifier 210 for the real-time or near real-time operational data. The application server 110 may be configured to determine the health status of the alternator 118 based on the output of the trained classifier 210 for the real-time or near real-time operational data. In an embodiment, the application server 110 may be configured to determine the remaining useful life of the alternator 118 based on the health status of the alternator 118.

Figure 7:
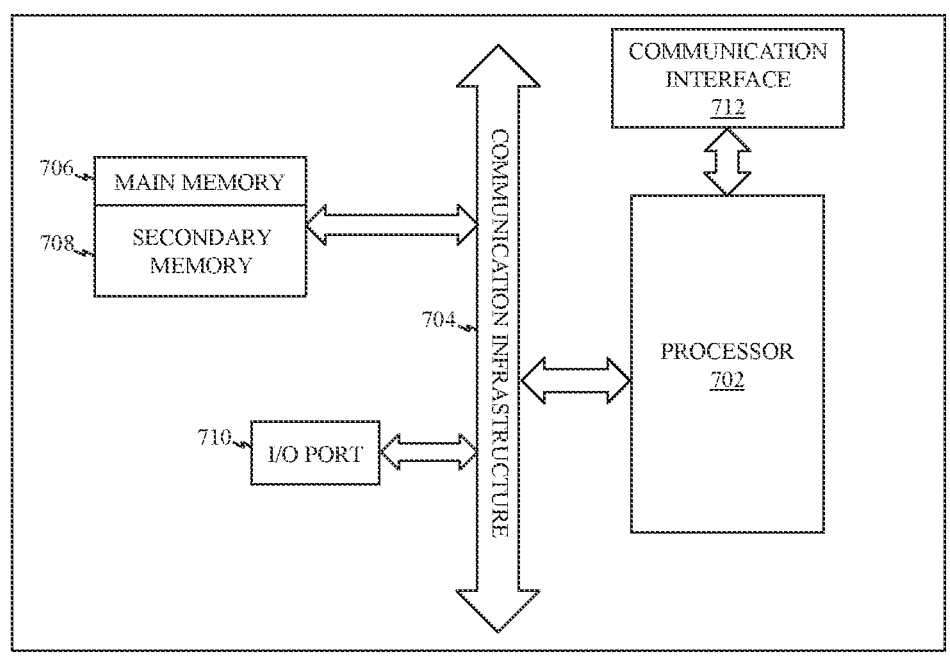
FIG. 7 is a block diagram that illustrates a system architecture of a computer system for predictive maintenance of a component of a vehicle, in accordance with an exemplary embodiment of the disclosure.

FIG. 7 is a block diagram that illustrates a system architecture of a computer system 700 for predictive maintenance of the component of the vehicle 102, in accordance with an exemplary embodiment of the disclosure. An embodiment of the disclosure, or portions thereof, may be implemented as computer readable code on the computer system 700. In one example, the application server 110 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4A and 4B, 5, and 6.

The computer system 700 may include a processor 702 that may be a special purpose or a general-purpose processing device. The processor 702 may be a single processor or multiple processors. The processor 702 may have one or more processor "cores." Further, the processor 702 may be coupled to a communication infrastructure 704, such as a bus, a bridge, a message queue, the communication network 112, multi-core message-passing scheme, or the like. The computer system 700 may further include a main memory 706 and a secondary memory 708. Examples of the main memory 706 may include RAM, ROM, and the like. The secondary memory 708 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 700 may further include an input/output (I/O) port 710 and a communication interface 712. The I/O port 710 may include various input and output devices that are configured to communicate with the processor 702. Examples of the input devices may include a keyboard, a mouse, a joystick, a touchscreen, a microphone, and the like. Examples of the output devices may include a display screen, a speaker, headphones, and the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communication port, and the like. Data transferred via the communication interface 712 may be signals, such as electronic, electromagnetic, optical, or other signals as will be apparent to a person skilled in the art. The signals may travel via a communications channel, such as the communication network 112, which may be configured to transmit the signals to the various devices that are communicatively coupled to the computer system 700. Examples of the communication channel may include a wired, wireless, and/or optical medium such as cable, fiber optics, a phone line, a cellular phone link, a radio frequency link, and the like. The main memory 706 and the secondary memory 708 may refer to non-transitory computer readable mediums that may provide data that enables the computer system 700 to implement the methods illustrated in FIGS. 4A and 4B, 5, and 6.

Various embodiments of the disclosure provide the application server 110 that is communicably coupled to the telematics device 104 of the vehicle 102 for predictive maintenance of the component of the vehicle 102. The application server 110 may be configured to collect, from the telematics device 104, the first operational data for the set of parameters (e.g., the first set of parameters 212 or the second set of parameters 302) associated with the component. The application server 110 may be configured to collect the first operational data over the first time-interval. The application server 110 may be further configured to select, from the first operational data, the dataset (e.g., the first dataset 214 or the second dataset 304) based on the engine status of the engine 114 of the vehicle 102. The application server 110 may be configured to process the selected dataset to obtain the plurality of feature values (e.g., the first plurality of feature values 216 or the second plurality of feature values 306). The application server 110 may be further configured to segregate the plurality of feature values into the plurality of clusters (e.g., the first plurality of clusters 218 or the second plurality of clusters 308). The application server 110 may be further configured to train the classifier 210 based on the plurality of clusters to determine the health status of the component. The application server 110 may be further configured to train the classifier 210 based on the vehicle data. The application server 110 may be further configured to validate the trained classifier 210 based on the historical maintenance data. The application server 110 may be further configured to receive, from the telematics device 104, the second operational data (i.e., real-time or near real-time operational data) for the set of parameters associated with the component. The second operational data is used as the input to the trained classifier 210. The application server 110 may be further configured to determine the health status of the component based on the output of the trained classifier 210 for the second operational data. The application server 110 may be configured to suggest a maintenance action (i.e. predictive maintenance) based on the determined health status of the component.

Various embodiments of the disclosure provide a non-transitory computer readable medium having stored thereon, computer executable instructions, which when executed by a computer, cause the computer to execute operations for predictive maintenance of the component of the vehicle 102. The operation includes collecting, by the application server 110, from the telematics device 104 of the vehicle 102, the first operational data for the set of parameters (e.g., the first set of parameters 212 or the second set of parameters 302) associated with the component. The first operational data is collected over the first time-interval. The operation further includes selecting, by the application server 110, from the first operational data, the dataset (e.g., the first dataset 214 or the second dataset 304) based on the engine status of the engine 114 of the vehicle 102. The operation further includes processing, by the application server 110, the selected dataset to obtain the plurality of feature values (e.g., the first plurality of feature values 216 or the second plurality of feature values 306). The operation includes segregating, by the application server 110, the plurality of feature values into the plurality of clusters (e.g., the first plurality of clusters 218 or the second plurality of clusters 308). The operation further includes training, by the application server 110, the classifier 210 based on the plurality of clusters to determine the health status of the component. Further, the operation also includes training the classifier 210 based on the vehicle data of the vehicle 102. In an embodiment, the operation also includes validating the trained classifier 210 based on the vehicle data and the historical maintenance data for the set of parameters associated with the component. The operation includes using the validation output as the feedback to improve the accuracy level of the trained classifier 210. The operation also includes receiving, by the application server 110, from the telematics device 104 of the vehicle 102, real-time or near real-time operational data for the set of parameters associated with the component. The second operational data is used as the input to the trained classifier 210. Further, the operation includes determining, by the application server 110, the health status of the component based on the output of the trained classifier 210 for the real-time or near real-time operational data. The operation further includes suggesting a maintenance action (i.e. predictive maintenance) based on the determined health status of the component. The operation also includes determining, by the application server 110, the remaining useful life of the component based on the health status of the component.

The disclosed embodiments encompass numerous advantages. Exemplary advantages of the disclosed methods include, but are not limited to, ensuring an uninterrupted monitoring of the health status of the battery 116 and/or the alternator 118 of the vehicle 102. The disclosed methods significantly reduce a time consumption and human intervention required for determination of the health status of the battery 116 and/or the alternator 118. Further, the regular determination of the health status of the component significantly reduces a probability of unexpected break downs. Therefore, preventing the driver/owner of the vehicle 102 from loss of money and time required for on-road support, and emotional despair caused due to the break down. The disclosed methods determine the health status of the battery 116 and/or the alternator 118 based on the real-time operational data. Therefore, the health status of the battery 116 and/or the alternator 118 is determined in real-time or near real-time. The real-time or near real-time determination of the health status of the battery 116 and/or the alternator 118 allows for a timely/planned and predictive maintenance (i.e. repair or replacement) of the vehicle 102 to prevent unexpected break downs.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for determining the health status of the component of the vehicle 102. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for predictive maintenance of a component of a vehicle, the method comprising:
   collecting, by a server, from a telematics device of the vehicle, first operational data for a set of parameters associated with the component of the vehicle over a first time-interval, and wherein the component of the vehicle is one of a battery or an alternator;
   selecting, by the server, from the first operational data, a first dataset based on an engine status of an engine of the vehicle, wherein
      the first dataset is collected by the server at a time the engine has an OFF status,
      the selected first dataset is associated with the battery of the vehicle, and
      the selected first dataset includes a discharge voltage of the battery during the OFF status of the engine of the vehicle;
   processing, by the server, the first dataset to obtain a plurality of feature values;
   segregating, by the server, the plurality of feature values into a plurality of clusters, wherein
      the segregating is based on clustering algorithms using machine learning models to label the plurality of clusters into one of a first cluster, a second cluster, and a third cluster, wherein each of the first cluster, the second cluster, and the third cluster of the plurality of clusters corresponds to a health status of the component of the vehicle, and
      the health status of the component of the vehicle corresponds to a working state and performance of the vehicle;
   training, by the server, a classifier of the server based on the plurality of clusters, wherein the training of the classifier comprises determining the health status of the component;
   outputting, by the trained classifier, the health status of the component based on historical maintenance data of the component of the vehicle;
   validating, by the server, an accuracy level of the classifier based on the health status output by the trained classifier and the historical maintenance data, wherein the accuracy level of the classifier is validated to generate a validation output;
   re-training, by the server, the classifier based on the validation output;
   receiving, by the server, from the telematics device of the vehicle, second operational data of the component of the vehicle, wherein
      the second operational data corresponds to real-time or near real-time operational data for the set of parameters associated with the component, and
      the real-time or near real-time operational data is input to the re-trained classifier;
   determining, by the server, the health status of the component of the vehicle based on an output of the re-trained classifier for the real-time or near real-time operational data; and
   determining, by the server, a remaining useful life of the component of the vehicle for a second time-interval, wherein the remaining useful life of the component is determined based on the health status determined for the real-time or near real-time operational data.

2. The method of claim 1, wherein the set of parameters includes the engine status of the engine, voltage data associated with the component, one or more diagnostic trouble codes associated with the component, and a past count of each of the one or more diagnostic trouble codes.

3. The method of claim 1, wherein the set of parameters includes one of an engine ON/OFF count of the engine, a maximum and minimum voltage associated with the component, an average voltage associated with the component, a deviation of minimum voltage associated with the component, an average minimum voltage associated with the component, an average maximum voltage associated with the component, and an average engine ON time of the engine.

4. The method of claim 1, further comprising training, by the server, the classifier based on vehicle data of the vehicle, wherein the vehicle data includes one of a vehicle model, a make of the vehicle, a vehicle manufacturing year, and a city of operation of the vehicle.

5. The method of claim 1, wherein the validation output is used as a feedback to improve the accuracy level of the trained classifier.

6. The method of claim 1, wherein the plurality of feature values includes one of a plurality of moving average values, a plurality of moving standard deviation values, a plurality of cumulative sum values, a plurality of rolling mean values, or a plurality of rolling standard deviation values obtained by processing the first dataset.

* * * * *